United States Patent
Yamashita et al.

(10) Patent No.: US 8,812,168 B2
(45) Date of Patent: Aug. 19, 2014

(54) TEMPERATURE MEASURING METHOD AND TEMPERATURE MEASURING DEVICE OF STEEL PLATE, AND TEMPERATURE CONTROL METHOD OF STEEL PLATE

(75) Inventors: Keiichi Yamashita, Kakogawa (JP); Tsuneaki Nishikawa, Kakogawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 1038 days.

(21) Appl. No.: 12/373,935

(22) PCT Filed: Jun. 18, 2007

(86) PCT No.: PCT/JP2007/062215
§ 371 (c)(1),
(2), (4) Date: Jan. 15, 2009

(87) PCT Pub. No.: WO2008/013004
PCT Pub. Date: Jan. 31, 2008

(65) Prior Publication Data
US 2009/0287360 A1    Nov. 19, 2009

(30) Foreign Application Priority Data
Jul. 27, 2006 (JP) ................................. 2006-205030

(51) Int. Cl.
*G05D 23/00* (2006.01)
(52) U.S. Cl.
CPC ..................................... *G05D 23/00* (2013.01)
USPC ........................... 700/299; 374/126; 702/134
(58) Field of Classification Search
CPC .................................................... G05D 23/00
USPC ............................ 700/299; 374/126; 702/134
See application file for complete search history.

(56) References Cited

U.S. PATENT DOCUMENTS 4,553,854 A    11/1985    Yamada et al.

FOREIGN PATENT DOCUMENTS

| JP | 54 85079 | 7/1979 | |
| JP | 58 133329 | 8/1983 | |
| JP | 58133329 A * | 8/1983 | ................ C22B 1/20 |
| JP | 59 87329 | 5/1984 | |
| JP | 59 111026 | 6/1984 | |
| JP | 60 86431 | 5/1985 | |

(Continued)

OTHER PUBLICATIONS

Office Action issued Oct. 18, 2010, in Korea Patent Application No. 10-2008-7031626.

*Primary Examiner* — Tejal Gami
(74) *Attorney, Agent, or Firm* — Oblon, Spivak, McClelland, Maier & Neustadt, L.L.P.

(57) ABSTRACT

A method and apparatus measuring temperature of a steel sheet. A reference plate including a temperature controller is disposed opposite to the steel sheet. The reference plate temperature of the reference plate is measured by a contact thermometer. A radiation pyrometer is trained on the steel sheet at an angle such that alternate reflection of radiation energy by the reference plate and the objective steel sheet occurs once or twice. The radiosity of the steel sheet is measured by the radiation pyrometer. A temperature obtained by converting the radiosity into a temperature of a blackbody that radiates energy equivalent to the radiosity is used as a radiosity temperature. The temperature controller executes a control operation to make the temperature of the reference plate coincide with the radiosity temperature. The radiosity temperature is used as the temperature of the steel sheet.

10 Claims, 6 Drawing Sheets

(56) References Cited

FOREIGN PATENT DOCUMENTS

| JP | 3 10128 | 1/1991 | | |
|---|---|---|---|---|
| JP | 03010128 A | * 1/1991 | ................ | G01J 5/00 |
| JP | 3 67137 | 3/1991 | | |
| JP | 03067137 A | * 3/1991 | ................ | G01J 5/10 |
| JP | 5 203497 | 8/1993 | | |
| JP | 5 203498 | 8/1993 | | |
| JP | 05203498 A | * 8/1993 | ................ | G01J 5/00 |

* cited by examiner

TEMPERATURE MEASURING METHOD AND TEMPERATURE MEASURING DEVICE OF STEEL PLATE, AND TEMPERATURE CONTROL METHOD OF STEEL PLATE

TECHNICAL FIELD

The present invention relates to a method of measuring the temperature of a steel sheet without touching the steel sheet and an apparatus for carrying out the method intended to be applied to, for example, a continuous annealing system and an alloy hot dip galvanizing system.

BACKGROUND ART

A variety of steel sheets are processed continuously by a continuous annealing system for continuously processing steel sheets by a heat treatment and an alloy hot dip galvanizing system for processing hot dip galvanized steel sheets by an alloying process. It is important to control the process such that the temperature of the steel sheet after a heat treatment process including heating and cooling is adjusted accurately to a desired temperature for stabilizing the mechanical characteristics, such as strength and elongation, and the plating characteristics, such as alloying degree, of different steel sheets.

Generally, a noncontact radiation pyrometer is used for measuring the temperature of the steel sheets continuously moving in those systems. The emissivity of the steel sheet, namely, an object of measurement, needs to be determined when the radiation pyrometer is used. Emissivity of the steel sheet is dependent on the physical properties, such as quality and surface characteristic, and temperature. Therefore, it is difficult to determine the emissivity of the steel sheet on the basis of those variable factors. Thus, a measurement error appears easily in the measurement of the temperature of the steel sheet and, consequently, control for accurately adjusting the temperature of the steel sheet to a desired temperature cannot be achieved.

Various measuring methods having the least possible susceptibility to the variation of the emissivity of the steel sheet have been proposed. Those measuring methods use multiple reflection on the basis of knowledge that multiple reflection increases an apparent emissivity.

A cavity method mentioned in Patent document 1 places two types of cylindrical cavities respectively having inside surfaces having high reflectivity nearly equal to that of a mirror surface near a steel sheet, compares radiant energy passed through a first cavity making multiple reflection and radiant energy passed through a second cavity without making multiple reflection to determine the temperature and thermal emissivity of the steel sheet. This cavity method needs the two cylindrical cavities, which needs a large space.

Measuring methods using multiple reflection between a steel sheet and a reflecting plate and not needing a large space have been proposed.

A measuring method mentioned in Patent document 2 places a reflecting plate at an inclination to a steel sheet, and takes a temperature indicated by a radiation thermometer as the temperature of the steel sheet, regarding radiant energy of multiple reflection between the steel sheet and the reflecting plate as blackbody radiant energy.

A measuring method mentioned in Patent document 3 determines the emissivity of a steel sheet on the basis of radiant energy determined by a measuring method similar to that mentioned in Patent document 2.

The measuring methods mentioned in Patent documents 2 and 3 (including the cavity method mentioned in Patent document 1) are based on the fact that the radiant energy of the reflecting plate is far less the radiant energy of multiple reflection when the reflecting plate is at an ordinary temperature or a low temperature and that the effect of the variation of the emissivity of the steel plate on the radiant energy of multiple reflection is ignorable when the reflecting plate has a high reflectivity, i.e., the emissivity is lower than that determined by the Kirchhoff's law, or when the reflectivity (emissivity) of the steel sheet is known. Therefore, the measuring methods mentioned in Patent documents 2 and 3 (including the cavity method mentioned in Patent document 1) need to maintain the reflectivity of the reflecting plate at a high level, i.e., to maintain the surface of the reflecting plate in a mirror surface, or to maintain the known reflectivity of the reflecting plate for a long time. Since the reflectivity (emissivity) of the reflecting plate changes due to the oxidation of the surface of the reflecting plate, it is difficult to maintain accuracy stably for a long time. Similar matters are mentioned in Patent document 5, which will be described later.

To solve those problems, a measuring method mentioned in Patent document 4 achieves the measurement of the temperature of a steel sheet regardless of the influence of the emissivity of the steel sheet by causing multiple reflection between the steel sheets. This measuring method uses a basic physical phenomenon that apparent emissivity increases when multiple reflection occurs within an object of measurement, does not use any reflecting plate and is not subject to the influence of the reflectivity (emissivity) of a reflecting plate. Since the apparent emissivity is approximately 1 even if the emissivity of the steel sheet varies, measurements obtained by this measuring method include a small error and this measuring method is scarcely subject to aging. However, this measuring method can be used for measurement only at a limited measuring position where parts of a steel sheet running between upper and lower hearth rollers of a vertical furnace face each other because this measuring method uses multiple reflection between parts of the steel sheet.

A measuring method mentioned in Patent document 5 was developed by incorporating improvements into the measuring method mentioned in Patent document 3. The measuring method mentioned in Patent document 5 intends to ensure the improvement of measurement accuracy by employing a function to maintain a reflecting plate at a fixed temperature even if the reflectivity (emissivity) of the reflecting plate changes with time.

As mentioned in Patent document 3, reflection needs to be repeated predetermined times between the reflection plate and the steel sheet for multiple reflection. The radiation pyrometer inevitably needs a large reflecting plate to ensure the necessary times of reflection when the radiation pyrometer is disposed at a small angle (the angle θ in FIG. 2 of Patent document 3). The measuring method mentioned in Patent document 5 needs to set the reflecting plate at a proper temperature according to the emissivity and temperature of the steel sheet and the emissivity of the reflection plate to control the steel sheet accurately at a desired temperature. Thus, it is difficult to control the steel sheet accurately and stably at a desired temperature for a long period of time.

Patent document 1: JP S54-85079 A
Patent document 2: JP 259-87329 A
Patent document 3: JP S59-111026 A
Patent document 4: JP S60-86432 A
Patent document 5: JP H5-203497 A

DISCLOSURE OF THE INVENTION

Problem to be Solved by the Invention

Accordingly, it is an object of the present invention to provide a method capable of accurately measuring the temperature of a steel sheet for a long period of time without being affected by the time-dependent change of the emissivity of a reflecting plate (referred to as "reference plate" in the present invention) and the variation of the emissivity of the steel sheet and of being carried out by a measuring apparatus capable of being easily installed as compared with a measuring apparatus for carrying out the foregoing measuring method using multiple reflection, a measuring apparatus for carrying out the measuring method, and a temperature control method using the measuring method and capable of still more accurately controlling the temperature of the steel sheet.

Means for Solving the Problem

The inventors of the present invention made the following studies on an assumption that the foregoing problems can be solved by using the radiosity, namely, the sum of radiation energy and reflection energy, of an objective steel sheet (sometimes, referred to simply as "steel sheet").

The radiosities of two steel sheet, namely, two finite flat sheet, are expressed by Expressions (11 and 12) ignoring background radiation from the surroundings.

$$G_1 = \epsilon_1 E(T_1) + (1-\epsilon_1) F_{21} G_2 \qquad (11)$$

$$G_2 = \epsilon_2 E(T_2) + (1-\epsilon_2) F_{12} G_1 \qquad (12)$$

Where:
$\epsilon_1$ and $\epsilon_2$: Respective emissivities of steel sheet and reference plate
$T_1$ and $T_2$: Respective absolute temperatures of steel sheet and reference plate
$E(T) = \sigma T^4$: Blackbody radiation energy at T (per unit area)
$\sigma$: Stefan-Boltzmann's constant
$G_1$ and $G_2$: Respective radiosities of steel sheet and reference plate (per unit area)

In Expressions (11) and (12), $F_{12}$ is view factor when the reference plate is viewed from the steel sheet and $F_{21}$ is view factor when the steel sheet is viewed from the reference plate. The view factors $F_{12}$ and $F_{21}$ are dependent on the respective geometric shapes of the steel sheet and the reference plate.

Expression (13) for calculating the blackbody radiation energy of the objective steel sheet is obtained by substituting Expression (12) into expression (11) to eliminate $G_2$.

$$E(T_1) = \left( \frac{F_{12}F_{21} + \frac{1-F_{12}F_{21}}{\varepsilon_1 + \varepsilon_2 - \varepsilon_1\varepsilon_2}}{} \right) G_1 + K \left[ \left( \frac{F_{12}F_{21} + \frac{1-F_{12}F_{21}}{\varepsilon_1 + \varepsilon_2}}{} \right) G_1 - F_{21}E(T_2) \right] \qquad (13)$$

In Expression (13), K is a correction coefficient defined by Expression (14) and dependent on the respective emissivities of the objective steel sheet and the reference plate.

$$K = \frac{(1-\varepsilon_1)\varepsilon_2}{\varepsilon_1} \qquad (14)$$

When both $F_{12}$ and $F_{21}$ are substantially equal to 1, Expression (13) can be converted into Expression (15) on an assumption that $F_{12} = F_{21} = 1$.

$$E(T_1) = G_1 + K[G_1 - E(T_2)] \qquad (15)$$

The relation between the radiosity $G_1$ of the steel sheet and the temperature $T_g$ of a blackbody that radiates energy equivalent to that radiated by the steel sheet (hereinafter, referred to as "radiosity temperature") is expressed by $G_1 = \sigma T_g^4$. Thus, Expression (16) is derived from Expression (15).

$$T_1^4 = T_g^4 + K(T_g^4 - T_2^4) \qquad (16)$$

The temperature $T_1$ of the steel sheet can be calculated by substituting the radiosity temperature $T_g$ and the temperature $T_2$ of the reference plate into Expression (16).

As shown by Expression (14), the correction coefficient K is a function of the respective emissivities $\epsilon_1$ and $\epsilon_2$ of the steel sheet and the reference plate. Therefore, the right member of Expression (16) is a function of the respective emissivities of the steel sheet and the reference plate. When $T_g \neq T_2$, the temperature $T_1$ of the steel sheet calculated by using Expression (16) includes a measurement error.

The inventors of the present invention made further studies to provide means for reducing the measurement error to the smallest possible value and developed the following first to third means.

First Means

The first means executes closed-loop control to make the temperature $T_2$ of the reference plate coincide with the radiosity temperature $T_g$ by heating or cooling the reference plate by a temperature controller. This causes the second term, $K(T_g^4 - T_2^4)$, of the right member of Expression (16) to approach 0. Consequently, Expression (16) is converted to $T_1^4 = T_g^4$, i.e., $T_1 = T_g$, after convergence, and the temperature $T_1$ of the steel sheet is determined without being affected by the accuracy of the correction coefficient K.

Second Means

The second means, similarly to the first means, executes the closed-loop control of the temperature $T_2$ of the reference plate to make the temperature $T_2$ of the reference place coincide with an approximation $T_1'$ of the temperature $T_1$ of the steel sheet calculated by using Expression (1) or (2) obtained by simplifying Expression (16) instead of coinciding with the radiosity temperature $T_g$. Consequently, the temperature $T_2$ Of the reference plate approaches the temperature $T_1$ of the steel sheet more quickly. Thus, convergence can be quickly achieved.

Third Means

The third means, differing from the first and the second means, sets a desired temperature $T_0$ of the steel sheet instead of executing a closed-loop control such that the temperature $T_2$ of the reference plate coincides with the radiosity temperature $T_g$ or the approximation $T_1'$ of the temperature $T_1$ of the steel sheet. Thus, the temperature $T_2$ of the reference plate can be previously adjusted to the desired temperature $T_0$ of the steel sheet and time needed to carry out closed-loop control omitted, and hence the accurate temperature of the steel sheet can be quickly determined.

The present invention made on the basis of the foregoing findings has the following gist.

A temperature measuring method of measuring the temperature of a steel sheet in a first aspect of the present invention includes the steps of: disposing a reference plate provided with a temperature controller opposite to an objective steel sheet; directly measuring the reference plate temperature $T_2$ of the reference plate by a thermometer other than a radiation pyrometer; training a radiation pyrometer on the objective steel sheet at an angle such that alternate reflection of radiation energy by the reference plate and the objective steel sheet occurs once or twice; measuring the radiosity of the objective steel sheet by the radiation pyrometer; using a temperature obtained by converting the radiosity into a temperature of a blackbody that radiate energy equivalent to the radiosity as a radiosity temperature $T_g$; executing a control operation by the temperature controller to make the temperature $T_2$ of the reference plate coincide with the radiosity temperature $T_g$; and using the radiosity temperature $T_g$ as the temperature of the objective steel sheet.

A temperature measuring method of measuring the temperature of a steel sheet in a second aspect of the present invention includes the steps of: disposing a reference plate provided with a temperature controller opposite to an objective steel sheet; directly measuring the reference plate temperature $T_2$ of the reference plate by a thermometer other than a radiation pyrometer; training a radiation pyrometer on the objective steel sheet at an angle such that alternate reflection of radiation energy by the reference plate and the objective steel sheet occurs once or twice; measuring the radiosity of the objective steel sheet by the radiation pyrometer; using a temperature obtained by converting the radiosity into a temperature of a blackbody that radiate energy equivalent to the radiosity as a radiosity temperature $T_g$; calculating an approximate temperature $T_1'$ of the steel sheet by using:

$$T_1' = T_g + K(T_g - T_2) \quad (1)$$

where K is a correction coefficient determined on the basis of the respective radiosities of the reference plate and the objective steel sheet obtained by measurement or mentioned in a literature; executing a control operation by the temperature controller to make the reference plate temperature $T_2$ coincide with the approximate temperature $T_1'$ of the steel sheet temperature; and using the approximate temperature $T_1'$ as the temperature of the objective steel sheet.

A temperature measuring method of measuring the temperature of a steel sheet in a third aspect of the present invention includes the steps of: disposing a reference plate provided with a temperature controller opposite to an objective steel sheet; executing a control operation by the temperature controller to make the reference plate temperature $T_2$ of the reference plate measured by a thermometer other than a radiation pyrometer coincide with a desired temperature $T_0$ of the steel sheet; training a radiation pyrometer on the objective steel sheet at an angle such that alternate reflection of radiation energy by the reference plate and the objective steel sheet occurs once or twice; measuring the radiosity of the objective steel sheet by the radiation pyrometer; using a temperature obtained by converting the radiosity into a temperature of a blackbody that radiate energy equivalent to the radiosity as a radiosity temperature $T_g$; and using the radiosity temperature $T_g$ as the steel sheet temperature of the objective steel sheet.

A temperature measuring method of measuring the temperature of a steel sheet in a fourth aspect of the present invention includes the steps of: disposing a reference plate provided with a temperature controller opposite to an objective steel sheet; executing a control operation by the temperature controller to make the reference plate temperature $T_2$ of the reference plate measured by a thermometer other than a radiation pyrometer coincide with a desired temperature $T_0$ of the steel sheet; training a radiation pyrometer on the objective steel sheet at an angle such that alternate reflection of radiation energy by the reference plate and the objective steel sheet occurs once or twice; measuring the radiosity of the objective steel sheet by the radiation pyrometer; using a temperature obtained by converting the radiosity into a temperature of a blackbody that radiate energy equivalent to the radiosity as a radiosity temperature $T_g$; and using an approximate steel sheet temperature $T_1'$ of the steel sheet calculated by using:

$$T_1' = T_g + K(T_g - T_2) \quad (1)$$

where K is a correction coefficient determined on the basis of the respective radiosities of the reference plate and the objective steel sheet obtained by measurement or mentioned in a literature, as the steel sheet temperature of the objective steel sheet.

The following expression may be used instead of Expression (1).

$$T_1' = F[T_g + K(T_g - T_2)] \quad (2)$$

where K is a correction coefficient determined on the basis of the respective radiosities of the reference plate and the objective steel sheet obtained by measurement or mentioned in a literature, and F is a coefficient dependent on the respective geometric shapes of the reference plate and the objective steel sheet, and the positional relation between the reference plate and the objective steel sheet.

A temperature measuring apparatus for measuring the temperature of a steel sheet in a fifth aspect of the present invention including: a reference plate disposed opposite to an objective steel sheet; a temperature controller for controlling the temperature of the reference plate; a thermometer, other than a radiation pyrometer, for measuring the temperature $T_2$ of the reference plate; a radiation pyrometer trained on the objective steel sheet at an angle such that alternate reflection of radiation energy by the reference plate and the objective steel sheet occurs once or twice to measure the radiosity of the objective steel sheet and to convert the radiosity into a radiosity temperature $T_g$ equal to a temperature of a blackbody that radiate energy equivalent to the radiosity; and an arithmetic circuit for calculating an approximate temperature $T_1'$ of the steel sheet by using an expression:

$$T_1' = T_g + K(T_g - T_2) \quad (1)$$

or $$T_1' = F[T_g + K(T_g - T_2)] \quad (2)$$

where K is a correction coefficient determined on the basis of the respective radiosities of the reference plate and the objective steel sheet obtained by measurement or mentioned in a literature, and F is a coefficient dependent on the respective geometric shapes of the reference plate and the objective steel sheet, and the positional relation between the reference plate and the objective steel sheet.

Preferably, the temperature measuring apparatus includes plural sets each of the reference plate, the temperature controller and the thermometer, and the respective temperatures of the reference plates can be individually controlled.

A control method of controlling the temperature of a steel sheet in a sixth aspect of the present invention includes the step of controlling a heating device for heating the steel sheet or a cooling device for cooling the steel sheet such that the temperature of the steel sheet measured by the foregoing temperature measuring method coincides with a desired temperature $T_0$ of the steel sheet.

Effect of the Invention

According to the present invention, the control operation is executed to make the temperature of the reference plate coincide with the temperature based on the radiosity of the objective steel sheet measured by the radiation pyrometer (the radiosity temperature) or the desired temperature of the steel sheet, and the temperature of the steel sheet is estimated on the basis of the radiosity temperature. Therefore, the temperature measuring apparatus of the present invention can be installed more easily than the temperature measuring apparatus for carrying out the measuring method using multiple reflection, and can maintain the accurately measurement of the temperature of a steel sheet for a long period of time without being affected by the variation of the emissivity of the objective steel sheet and the change of the emissivity of the reference plate (the reflection plate of the conventional measuring apparatus) with time. An operation for heating or cooling the steel sheet is controlled by using the accurate measured temperature of the steel sheet to control the temperature of the steel sheet accurately.

REFERENCE CHARACTERS

Figure 1:
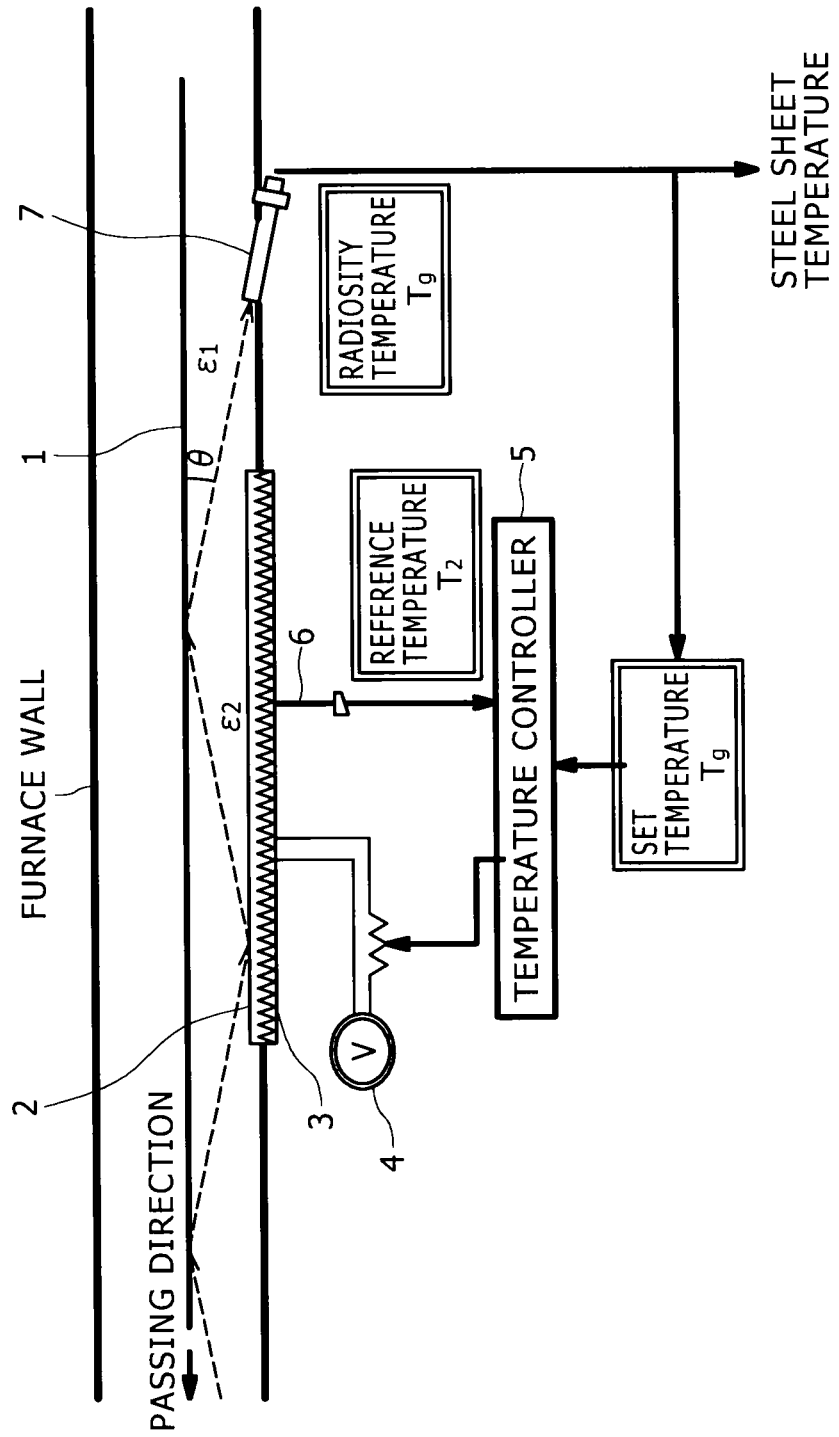
FIG. 1 is a sectional view taken in a direction in which a sheet is passed and a control flow diagram in explaining the outline of the construction of a temperature measuring apparatus in a first embodiment for measuring the temperature of a steel sheet.

1: Steel sheet
2: Reference plate
3: Heater
4: Heater power source
5: Temperature control apparatus
6: Contact thermometer
7: Thermometer (contact thermometer)
8: Arithmetic circuit for calculating steel sheet temperature
9: Selector circuit

BEST MODE FOR CARRYING OUT THE INVENTION

The present invention will be described in detail with reference to the accompanying drawings.

[First Embodiment]

FIG. 1 is a sectional view taken in a direction in which a sheet is passed and a control flow diagram of assistance in explaining the outline of the construction of a temperature measuring apparatus employing the first means for measuring the temperature of a steel sheet.

Referring to FIG. 1, a reference plate 2 is disposed opposite to a steel sheet 1 so as to extend parallel to the steel sheet 1.

The temperature measuring methods using multiple reflection mentioned in Patent documents 2, 3 and 5 need the reflecting plate disposed at an inclination to the steel sheet to cause reflection a predetermined times for multiple reflection. The reference plate 2 of the present invention can diminish measurement error by increasing the view factors F12 and F21 of Expression (13) as close as to 1. Therefore, it is desirable to dispose the reference plate parallel to the objective steel sheet and as close as possible to the steel sheet so that the reference plate has a maximum view factor. In some cases, the steel sheet 1 meanders vertically (waves). Therefore, the reference plate 2 needs to be separated from the steel sheet 1 by a space having a predetermined size.

A built-in heater 3 is incorporated into the reference plate 2 to control the temperature of the reference plate 2. The heater 3 can be heated by a power source 4 provided with a temperature controller 5.

A contact thermometer 6 for directly measuring the temperature of the reference plate 2, such as a thermocouple, namely, a thermometer employed in addition to a radiation pyrometer 7, is placed in contact with the reference plate 2. The temperature controller 5 regulates the output of the heater power source 4 on the basis of temperature $T_2$ of the reference plate 2 measured by the contact thermometer 6 so that the temperature $T_2$ is equal to a predetermined temperature, which will be described later. A set initial temperature for the temperature $T_2$ of the reference plate 2 is, for example, a desired temperature $T_0$ of the steel sheet 1. It is desirable that the measured temperature $T_2$ of the reference plate 2 is the mean of temperatures measured by plural contact thermometer 6 placed in contact with the reference plate 2.

The radiation pyrometer 7 is directed toward a surface of the steel sheet 1 to receive the radiosity of the steel sheet 1 through the space between the reference plate 2 and the steel sheet 1. The angle θ of the thermal pyrometer 7 to the surface of the steel sheet 1 is adjusted such that alternate reflection of radiation energy by the reference plate and the objective steel sheet occurs once or twice. Each of the reference plate 2 and the steel sheet 1 is desired to reflect radiation energy at least once, because radiation energy from the background, such as the wall of the furnace, is reflected directly by the steel sheet 1 as part of the radiosity of the steel sheet 1 (reflected energy) and measurement error increases if radiation energy is received by the radiation pyrometer without being reflected by the reference plate 2. When radiation energy reflected at least once by the reference plate 2 is reflected by the steel sheet 1, the influence of the radiation energy from the background is reduced to an ignorable extent and measurement error can be satisfactorily diminished. Reflection of radiation energy between the reference plate 2 and the steel sheet is desired to occur twice at the most because the influence of radiation energy from the background is reduced satisfactorily before the radiation energy is reflected three times and further reflection of the radiation energy is scarcely effective in diminishing measurement error, and a large reference plate is necessary to cause reflection of the radiation energy three times or above.

The angle θ between the radiation pyrometer 7 and the steel sheet 1 may be properly adjusted such that the reflection of radiation energy between the reference plate 2 and the steel sheet 1 occurs once or twice according to the size of the reference plate 2 and the distance between the steel sheet 1 and the reference plate 2. In view of facilitating receiving radiosity by increasing the directional emissivity of the steel sheet 1 and restrictions on a space for installing the radiation pyrometer 7 placed by the facilities, it is desirable that the angle θ is 5° or above and below 60°, more desirably, in the range of 10° to 50°, most desirably, in the range of 20° to 40°.

The radiosity of the steel sheet 1 is measured by the radiation pyrometer 7. The relation between radiation energy measured by the radiation pyrometer 7 and the radiosity of the steel sheet 1 is expressed by:

$$F_g G_1 = \epsilon_r E_r$$

$F_g$: View factor from the steel sheet to the radiation pyrometer
$E_r$: Blackbody energy measured by the radiation pyrometer
$\epsilon_r$: Emissivity set for the radiation pyrometer.

Since $G_1 = E_r$: when $F_g = \epsilon_r$, radiosity temperature $T_g$ (temperature indicated by the radiation pyrometer) corresponding to the temperature of a blackbody that radiate energy equivalent to the radiosity $G_1$ of the steel sheet can be measured by setting view factor $F_g$ from the steel sheet to the radiation pyrometer to the emissivity $\epsilon_r$ for the radiation pyrometer 7.

The view factor $F_g$ can be theoretically determined because the view factor $F_g$ from the steel sheet to the radiation pyrometer is dependent on the respective geometrical shapes of the steel sheet and the radiation pyrometer, the positional relation between the steel sheet and the radiation pyrometer and the directional emissivity of the steel sheet. The view factor $F_g$ can be determined, for example, through off-line experiments using the same view factor and positional relation.

The radiation-pyrometer-indicated temperature (radiosity temperature) $T_g$ measured by the radiation pyrometer 7 is given as a set temperature for the reference plate temperature $T_2$ to the temperature controller 5. The output of the heater power source 4 is regulated such that the reference plate temperature $T_2$ coincides with the radiosity temperature $T_g$. The radiosity temperature $T_g$ changes while the output of the power source 4 is controlled so that $T_2$ coincides with $T_g$ and, eventually, $T_2$ converges and $T_2 = T_g$ is achieved. Since the difference $\Delta T$ between $T_2$ and $T_g$ decreases gradually and approaches 0, steel sheet temperature can be accurately measured by a measuring method that regards $T_g$ as steel sheet temperature $T_1$. Accurate steel sheet temperature control can be achieved by controlling a heating device for heating the steel sheet or a cooling device for cooling the steel sheet so as to make the steel sheet temperature $T_1$ coincide with a desired temperature $T_0$ of steel sheet.

[Second Embodiment]

Figure 2:
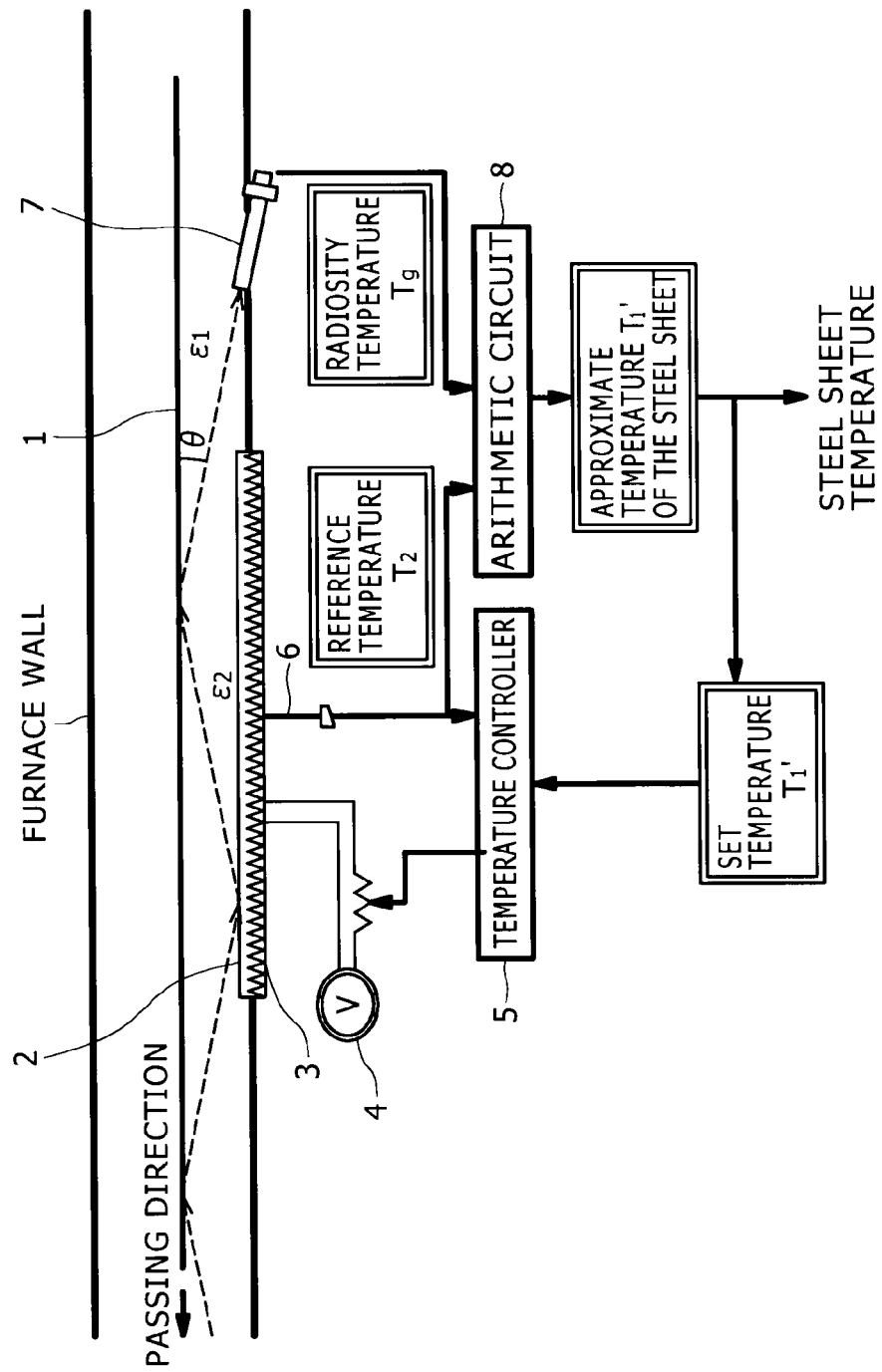
FIG. 2 is a sectional view taken in a direction in which a sheet is passed and a control flow diagram in explaining the outline of the construction of a temperature measuring apparatus in a second embodiment for measuring the temperature of a steel sheet.

FIG. 2 is a sectional view taken in a direction in which a sheet is passed and a control flow diagram of assistance in explaining the outline of the construction of a temperature measuring apparatus in an embodiment employing the second means for measuring the temperature of a steel sheet.

As shown in FIG. 2, this embodiment is built by adding an arithmetic circuit for calculating the temperature of a steel sheet (hereinafter, referred to simply as "arithmetic circuit") 8 to the construction of the foregoing first embodiment (FIG. 1).

Procedures for measuring reference plate temperature $T_2$ and radiation-pyrometer-indicated temperature (radiosity temperature) $T_g$ are similar to those executed by the foregoing embodiment and hence the description thereof will be omitted.

Reference plate temperature $T_2$ measured by a contact thermometer 6 and radiation-pyrometer-indicated temperature $T_g$ are given to the arithmetic circuit 8. The arithmetic circuit 8 calculates an approximate temperature $T_1'$ of steel sheet temperature $T_1$ by using Expression (1) obtained by simplifying Expression (16).

$$T' = T_g + K(T_g - T_2) \quad (1)$$

A procedure for deriving Expression (1) from Expression (16) will be described.

From Expression (16), $$T_1^4 = (1+K)T_g^4 - KT_2^4$$
$$= T_g^4 + K(T_g^4 - T_2^4)$$
$$= T_g^4[1 + K(1 - (T_2/T_g)^4)].$$

When $(T_2/T_g) = a$, $$T_1^4 = T_g^4[1+K(1-a^4)] = T_g^4[1+K(1-a)(1+a)(1+a^2)]$$

when $a \approx 1$, $$T_1^4 \approx T_g^4[1+4K(1-a)].$$

Therefore, $$T_1 \approx T_g[1+4K(1-a)]^{1/4}$$

When $b \approx 0$, $1-b \approx (1-4b)^{1/4}$ because $(1-b)^4 = (1-4b+6b^2-4b^3+b^4) \approx (1-4b)$.

Therefore, $$T_1 \approx T_g[1 + K(1-a)]$$
$$= T_g[1 + K(1 - T_2/T_g)]$$
$$= T_g + K(T_2 - T_g)$$

Thus, Expression (1) can be obtained by replacing $T_1$ with $T_1'$.

In Expression (1), K is a correction coefficient as a function of only the respective emissivities $\epsilon_1$ and $\epsilon_2$ of the steel sheet 1 and the reference plate 2 as expressed by Expression (14). Thus, the correction coefficient K is affected by the variation of the respective emissivities of the steel sheet 1 and the reference plate 2. However, an error resulting from the correction coefficient K is eliminated and accurate measurement of the temperature of the steel sheet 1 can be achieved because the reference plate temperature $T_2$ is controlled so as to coincide with the radiosity temperature $T_g$.

Accordingly, the value of the correction coefficient K dose not need to be exactly set. However, the value of the correction coefficient K needs to be accurate to some degree because the correction coefficient K has influence on time in which the measured steel sheet temperature reaches a predetermined accuracy. Therefore, values determined through off-line measurement or means in ranges of variation expected from values mentioned in a literature are employed as the estimated values of the respective emissivities $\epsilon_1$ and $\epsilon_2$ of the steel sheet 1 and the reference plate 2. The value of the correction coefficient K may be a value obtained through calculation using Expression (14) and those estimated values of the respective emissivities $\epsilon_1$ and $\epsilon_2$ of the steel sheet 1 and the reference plate 2.

The approximate temperature $T_1'$ of the steel sheet calculated by the arithmetic circuit 8 is given as a set value of the reference plate temperature $T_2$ to the temperature controller 5. The output of the heater power source 4 is regulated so as to make the reference plate temperature $T_2$ coincide with $T_1'$. Since the difference $\Delta T$ between $T_2$ and $T_g$ decreases gradually and approaches 0, steel sheet temperature can be accurately measured by a measuring method that regards $T_1'$ as steel sheet temperature $T_1$.

Although this embodiment, as compared with the first embodiment, additionally needs the arithmetic circuit 8, it is expected that this embodiment can achieve the accurate steel sheet temperature measurement more quickly than the method in the first embodiment by directly controlling the reference plate temperature $T_2$ to make the reference plate temperature $T_2$ approach the approximate value $T_1'$ of the steel sheet temperature $T_1$. Accurate measurement of the steel sheet temperature can be achieved without using a computer capable of high-speed computation as the arithmetic circuit 8 and without sacrificing response characteristic by using Expression (1), which is a simple linear expression.

[Third Embodiment]

Figure 3:
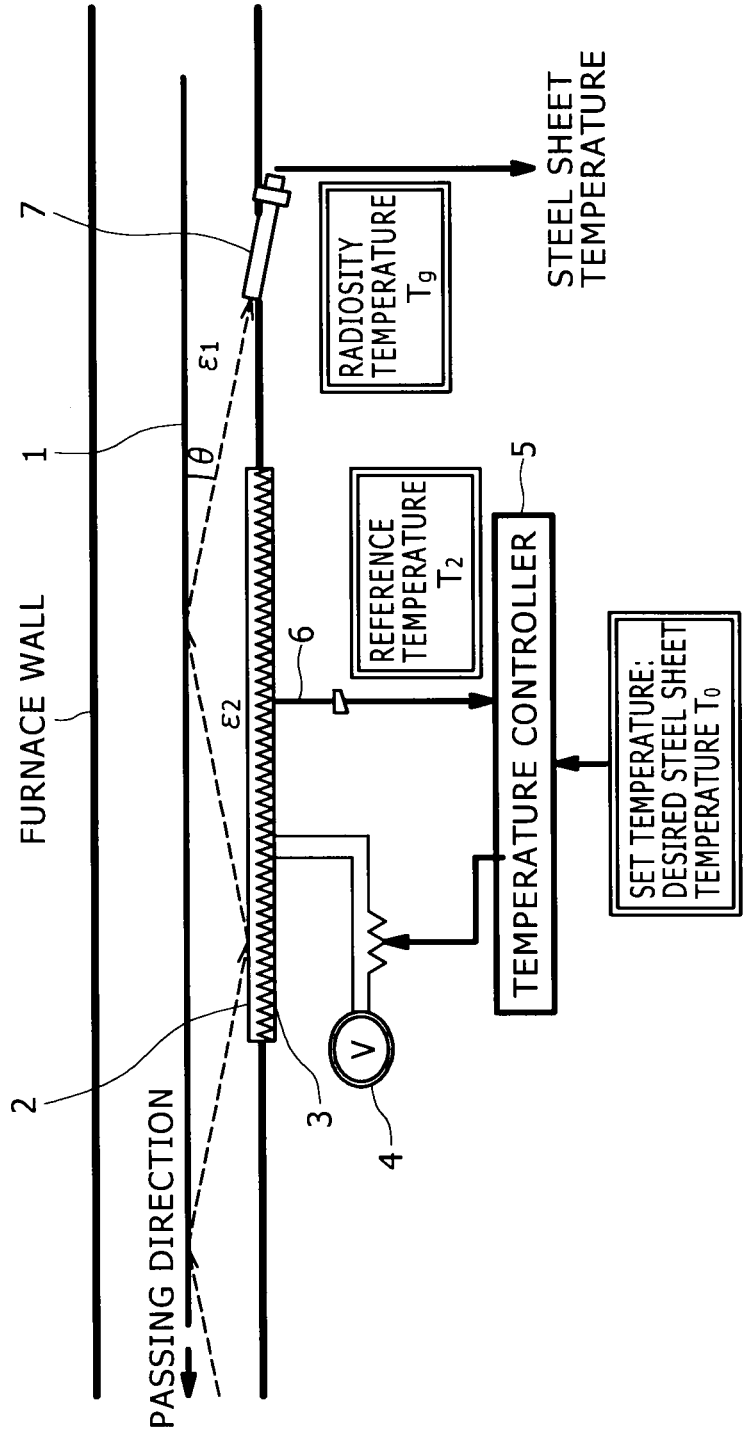
FIG. 3 is a sectional view taken in a direction in which a sheet is passed and a control flow diagram in explaining the outline of the construction of a temperature measuring apparatus in a third embodiment for measuring the temperature of a steel sheet.

FIG. 3 is a sectional view taken in a direction in which a sheet is passed and a control flow diagram of assistance in explaining the outline of the construction of a temperature measuring apparatus employing the third means for measuring the temperature of a steel sheet.

As shown in FIG. 3, this embodiment uses a desired temperature $T_0$ of a steel sheet, namely, a fixed value, as a set temperature given to a temperature controller 5 instead of the radiation-pyrometer-indicated temperature (radiosity temperature) $T_g$ used by the first embodiment shown in FIG. 1. This embodiment takes a radiation-pyrometer-indicated temperature (radiosity temperature) $T_g$ directly for the steel sheet temperature $T_1$ without executing control operations. As obvious from Expression (16), in this embodiment, the steel sheet temperature $T_1$ includes a measurement error when the radiosity temperature $T_g$ and the reference plate temperature $T_2$ are not equal to each other. The set reference plate temperature $T_2$ is equal to the desired temperature $T_0$ of the steel sheet and the actual steel sheet temperature $T_1$ is controlled so as to coincide with the desired temperature $T_0$ of the steel sheet. Therefore, the radiosity temperature $T_g$ approaches the desired temperature $T_0$ of the steel sheet and the measurement error is not very large. Since the reference plate temperature $T_2$ does not need to be controlled, the reference plate temperature $T_2$ can be set to the desired temperature $T_0$ of the steel sheet beforehand before starting passing the steel sheet. Thus, the measured steel sheet temperature $T_1$ can be obtained more quickly.

[Fourth Embodiment]

Figure 4:
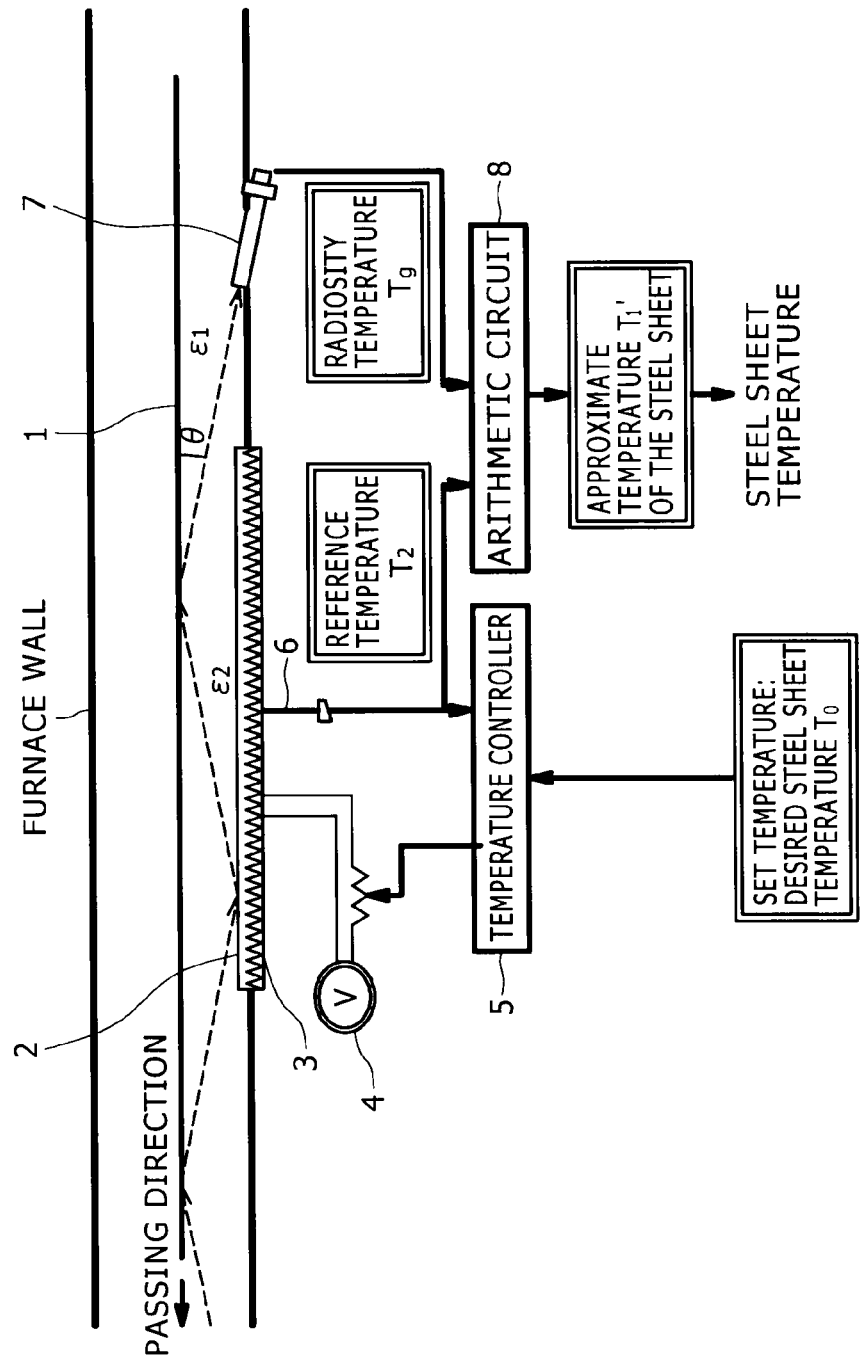
FIG. 4 is a sectional view taken in a direction in which a sheet is passed and a control flow diagram in explaining the outline of the construction of a temperature measuring apparatus in a fourth embodiment for measuring the temperature of a steel sheet.

FIG. 4 is a sectional view taken in a direction in which a sheet is passed and a control flow diagram of assistance in explaining the outline of the construction of another temperature measuring apparatus employing the third means for measuring the temperature of a steel sheet.

As shown in FIG. 4, this embodiment is built by adding an arithmetic circuit 8 for calculating the temperature of a steel sheet to the construction of the foregoing third embodiment (FIG. 3).

This embodiment, similarly to the third embodiment, sets the reference plate temperature $T_2$ to a desired temperature $T_0$ of the steel sheet and, similarly to the second embodiment, gives a radiation-pyrometer-indicated temperature $T_g$ and a reference plate temperature $T_2$ measured by a contact thermometer 6 to the arithmetic circuit 8. The arithmetic circuit 8 calculates an approximate temperature $T_1'$ of the steel sheet temperature $T_1$ by using Expression (1). The calculated approximate temperature $T_1'$ may be used as a steel sheet temperature $T_1$.

Although this embodiment, as compared with the third embodiment, additionally needs the arithmetic circuit 8, this embodiment can determine a steel sheet temperature accurately even if the actual steel sheet temperature $T_1$ is different from the desired temperature $T_0$ of the steel sheet.

[Fifth Embodiment]

Expression (2) may be used for calculating the approximate temperature $T_1'$ of the steel sheet temperature instead of Expression (1) used by the second and the fourth embodiment.

$$T_1'=F[T_g+K(T_g-T_2)] \quad (2)$$

where F is a coefficient dependent on the respective view factors of a reference plate 2 and a steel sheet 1, and the positional relation between the reference plate 2 and the steel sheet 1.

A process of obtaining Expression (2) will be described.

Expression (13) can be simplified to obtain the following expression when $F_{21}$ cannot be considered to be substantially equal to 1 but is close to 1 due to the variation of the geometric relation between the steel sheet 1 and the reference plate 2, for example, when the width of the steel sheet is changed greatly even though the value of $F_{12}$ of Expression (13) is substantially equal to 1, by assuming that $F_{12}F_{21}=F_{21}$ and $(1-F_{12}F_{21})/(\epsilon_1+\epsilon_2-\epsilon_1\epsilon_2)=0$.

$$E(T_1)=F_{21}\{G_1+K[G_1-E(T_2)]\}$$

If it is assumed that $F_{21}=F^4$ in this expression, the following expression is obtained by the same process as that of obtaining Expression (1).

$$T_1 \approx F[T_g+K(T_2-T_g)]$$

Expression (2) is obtained by replacing $T_1$ with $T_1'$.

The view factor F12 can be theoretically calculated on the basis of only the geometric relation between two surfaces (Nippon Kikai Gakkai, "Dennetsu Kougaku Shiryou 4th edition", Maruzen, October, 1986, Expression (7), p. 159). Therefore, F is defined univocally by $F=F_{21}^{1/4}$. The steel sheet temperature can be measured still more accurately by using Expression (2) instead of Expression (1).

[Sixth Embodiment]

Figure 5:
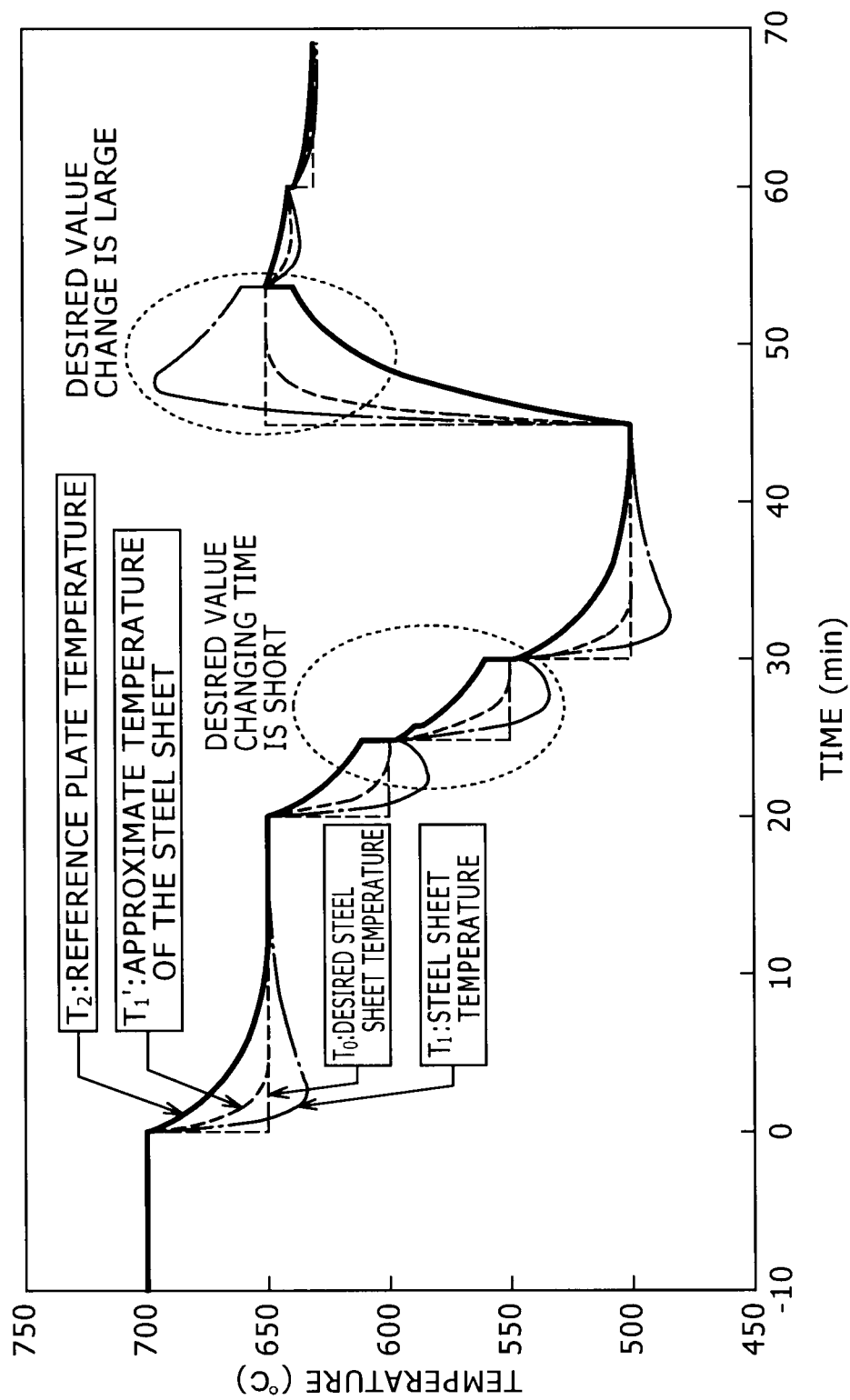
FIG. 5 is a graph typically showing the respective modes of variation of the temperature of a reference plate, the temperature of a steel sheet, and the approximate temperature of the steel sheet when a desired temperature of the steel sheet is changed stepwise.

In a continuous annealing system and a hot dip galvanizing system that process a steel sheet 1 continuously by a heat treatment process, a desired temperature of a steel sheet for a heat treatment process including heating or cooling is changed stepwise as shown in FIG. 5 to provide steel sheets of different qualities with different mechanical properties, such as strength and elongation, and different plating characteristics, such as degree of alloying. Therefore, the reference plate temperature $T_2$ needs to be changed according to the change of the desired temperature $T_0$ of the steel sheet when the present invention is applied to those systems. Delay in response occurs necessarily in changing the desired temperature $T_0$ of the steel sheet as shown in FIG. 5. When the steel sheet is maintained at the desired temperature for a short period of time, a control operation for changing the present desired temperature for the next desired temperature of the steel sheet is executed before the reference plate temperature $T_2$ reaches the desired temperature of the steel sheet. Therefore, it takes time for the steel sheet temperature $T_1$ calculated by using Expression (16) and the approximate value $T_1'$ of the steel sheet temperature calculated by using Expression (1) to reach the desired temperature $T_0$ of the steel sheet. Consequently, the present desired temperature of the steel sheet is changed for the next desired temperature of the steel sheet before the desired temperature $T_0$ is reached and the accuracy of measurement of the temperature of the steel sheet worsens.

Figure 6:
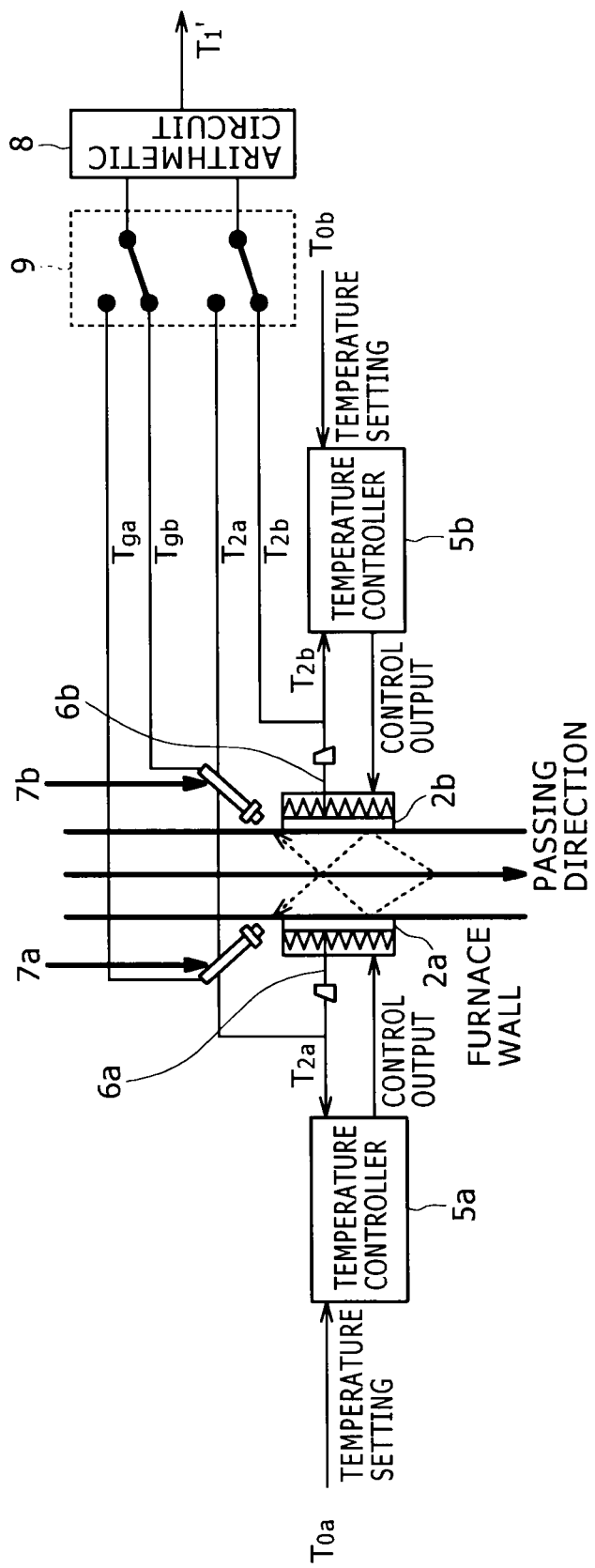
FIG. 6 is a sectional view taken in a direction in which a sheet is passed and a control flow diagram in explaining the outline of the construction of a temperature measuring apparatus in a sixth embodiment for measuring the temperature of a steel sheet.

Accordingly, as shown in FIG. 6, two reference plates 2a and 2b are disposed in a furnace, temperature controllers 5a and 5b, contact thermometers 6a and 6b and radiation pyrometers 7a and 7b are used, one arithmetic circuit 8 for calculating steel sheet temperature is used, and a switching circuit 9 capable of giving reference plate temperatures $T_{2a}$ and $T_{2b}$ measured, respectively, by the reference plates 2a and 2b alternately to the arithmetic circuit 8 for calculating steel sheet temperature and of giving the radiosity temperatures $T_{ga}$ and $T_{gb}$ measured, respectively, by the radiation pyrometers 7a and 7b alternately to the arithmetic circuit 8 for calculating steel sheet temperature is used. When a steel sheet 1b different in desired temperature from the presently processed steel sheet 1a is to be passed continuously, it is recommended to set the reference plate 2b other than the presently used reference plate 2a beforehand so as to be heated at a desired temperature of the steel sheet 1b and to set the switching circuit 9 so as to connect the reference plate 2b and the radiation pyrometer 7b to the arithmetic circuit 8.

[Modifications]

In the first to the sixth embodiment, the heater 3 is used by way of example as a heating means for regulating the temperature of the reference plate 2. A cooling means, such as an air-cooling device or a water-cooling device, may be used in addition to the heating means. Use of both the heating means and the cooling means enables still quicker control of the reference plate temperature $T_2$.

Although the contact thermometer, such as a thermocouple, is used by way of example as a thermometer by the first to the sixth embodiment for directly measuring the temperature of the reference plate 2, the thermometer is not limited thereto. For example, a noncontact thermometer including a thermocouple placed in a cavity may be used.

The first to the third embodiment regard the $T_g$ or $T_1'$ as the steel sheet temperature while the reference plate temperature $T_2$ is being controlled. It is possible to execute a closed-loop control that takes $T_g$ or $T_1'$ for the steel plate temperature when the difference $\Delta T$ between $T_2$ and $T_g$ or $T_1'$ decreases below a predetermined value, such as 5° C.

In the sixth embodiment, the two reference plates 2a and 2b are disposed on the opposite sides, respectively, of the steel sheet 1. The two reference plates 2a and 2b may be arranged in a steel sheet passing direction.

The embodiment is provided with the two reference plates by way of example. The embodiment may be provided with three or more reference plates and those plates may be used by turns.

The reference plates 2a and 2b are provided with the radiation pyrometers 7, respectively, by way of example. One radiation pyrometer 7 may be moved alternately to the two reference plates 2a and 2b.

In the embodiment described above by way of example is provided with only the single arithmetic circuit 8 for calculating steel sheet temperature, and the switching circuit connects the combinations each of the reference plate 2 and the radiation pyrometer 7 selectively to the arithmetic circuit 8. The switching circuit may be omitted and the combinations each of the reference plate and the radiation pyrometer may be connected to arithmetic circuits 8 for calculating steel sheet temperature, respectively.

The invention claimed is:

1. A temperature measuring method of measuring the temperature of a steel sheet, said temperature measuring method comprising:

disposing a reference plate provided with a temperature controller opposite to an objective steel sheet;

directly measuring the reference plate temperature $T_2$ of the reference plate by a thermometer other than a radiation pyrometer;

training a radiation pyrometer on the objective steel sheet at an angle such that it receives radiation energy that has been alternately reflected by the reference plate and the objective steel sheet once or twice;

measuring the radiosity of the objective steel sheet by the radiation pyrometer;

using a temperature obtained by converting the radiosity into a temperature of a blackbody that radiate energy equivalent to the radiosity as a radiosity temperature $T_g$;

calculating an approximate temperature $T_1'$ of the steel sheet by using:

$$T_1' = T_g + K(T_g - T_2) \quad (1)$$

where K is a correction coefficient determined on the basis of the respective radiosities of the reference plate and the objective steel sheet obtained by measurement or mentioned in a literature;

executing a control operation by the temperature controller to make the reference plate temperature $T_2$ coincide with the approximate temperature $T_1'$ of the steel sheet temperature; and using the approximate temperature $T_1'$ as the temperature of the objective steel sheet.

2. A temperature measuring method of measuring the temperature of a steel sheet comprising:

disposing a reference plate provided with a temperature controller opposite to an objective steel sheet;

executing a control operation by the temperature controller to make the reference plate temperature $T_2$ of the reference plate measured by a thermometer other than a radiation pyrometer coincide with a desired temperature $T_0$ of the steel sheet;

training a radiation pyrometer on the objective steel sheet at an angle such that it receives radiation energy that has been alternately reflected by the reference plate and the objective steel sheet once or twice;

measuring the radiosity of the objective steel sheet by the radiation pyrometer;

using a temperature obtained by converting the radiosity into a temperature of a blackbody that radiate energy equivalent to the radiosity as a radiosity temperature $T_g$; and using an approximate steel sheet temperature $T_1'$ of the steel sheet calculated by using:

$$T_1' = T_g + K(T_g - T_2) \quad (1)$$

where K is a correction coefficient determined on the basis of the respective radiosities of the reference plate and the objective steel sheet obtained by measurement or mentioned in a literature, as the steel sheet temperature of the objective steel sheet.

3. The temperature measuring method of measuring the temperature of a steel sheet according to claim 1, wherein an expression:

$$T_1' = F[T_g + K(T_g - T_2)] \quad (2)$$

where K is a correction coefficient determined on the basis of the respective radiosities of the reference plate and the objective steel sheet obtained by measurement or mentioned in a literature, and F is a coefficient dependent on the respective geometric shapes of the reference plate and the objective steel sheet, and the positional relation between the reference plate and the objective steel sheet is used instead of Expression (1).

4. A temperature measuring apparatus for measuring the temperature of a steel sheet, said temperature measuring apparatus comprising:

a reference plate disposed opposite to an objective steel sheet;

a temperature controller for controlling the temperature of the reference plate;

a thermometer, other than a radiation pyrometer, for measuring the temperature $T_2$ of the reference plate;

a radiation pyrometer trained on the objective steel sheet at an angle such that it receives radiation energy that has been alternately reflected by the reference plate and the objective steel sheet once or twice to measure the radiosity of the objective steel sheet and to convert the radiosity into a radiosity temperature $T_g$ equal to a temperature of a blackbody that radiate energy equivalent to the radiosity; and an arithmetic circuit for calculating an approximate temperature $T_1'$ of the steel sheet by using an expression:

$$T_1' = T_g + K(T_g - T_2) \quad (1)$$

or $$T_1' = F[T_g + K(T_g - T_2)] \quad (2)$$

where K is a correction coefficient determined on the basis of the respective radiosities of the reference plate and the objective steel sheet obtained by measurement or mentioned in a literature, and F is a coefficient dependent on the respective geometric shapes of the reference plate and the objective steel sheet, and the positional relation between the reference plate and the objective steel sheet.

5. The temperature measuring apparatus according to claim 4 comprising plural sets each of the reference plate, the temperature controller and the thermometer, wherein the respective temperatures of the reference plates can be individually controlled.

6. The temperature measuring method of measuring the temperature of a steel sheet according to claim 2, wherein an expression:

$$T_1' = F[T_g + K(T_g - T_2)] \quad (2)$$

where K is a correction coefficient determined on the basis of the respective radiosities of the reference plate and the objective steel sheet obtained by measurement or mentioned in a literature, and F is a coefficient dependent on the respective geometric shapes of the reference plate and the objective steel sheet, and the positional relation between the reference plate and the objective steel sheet is used instead of Expression (1).

7. A control method of controlling the temperature of a steel sheet, said control method comprising controlling a heating device for heating the steel sheet or a cooling device for cooling the steel sheet such that the temperature of the steel sheet measured by the temperature measuring method according to claim 2 coincides with a desired temperature $T_0$ of the steel sheet.

8. The temperature measuring method according to claim 1, wherein the reference plate is provided parallel to the objective steel sheet, and the objective steel sheet is arranged to receive radiation energy that has been alternately reflected by the reference plate and the objective steel sheet no more than twice.

9. The temperature measuring method according to claim 2, wherein the reference plate is provided parallel to the objective steel sheet, and the objective steel sheet is arranged to receive radiation energy that has been alternately reflected by the reference plate and the objective steel sheet no more than twice.

10. The temperature measuring apparatus according to claim 4, wherein the reference plate is provided parallel to the objective steel sheet, and the objective steel sheet is arranged to receive radiation energy that has been alternately reflected by the reference plate and the objective steel sheet no more than twice.

* * * * *